United States Patent
Zhang et al.

(10) Patent No.: US 10,991,120 B2
(45) Date of Patent: Apr. 27, 2021

(54) METHOD AND APPARATUS FOR PROCESSING A PLURALITY OF UNDIRECTED GRAPHS

(71) Applicant: SAMSUNG ELECTRONICS CO., LTD., Suwon-si (KR)

(72) Inventors: Hui Zhang, Beijing (CN); ByungIn Yoo, Seoul (KR); Deheng Qian, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 105 days.

(21) Appl. No.: 16/191,102

(22) Filed: Nov. 14, 2018

(65) Prior Publication Data

US 2019/0147617 A1    May 16, 2019

(30) Foreign Application Priority Data

Nov. 14, 2017   (CN) .......................... 201711124245.5
Aug. 6, 2018    (KR) ......................... 10-2018-0091157

(51) Int. Cl.
*G06T 7/73*  (2017.01)
*G06K 9/62*  (2006.01)
(Continued)

(52) U.S. Cl.
CPC .............. *G06T 7/74* (2017.01); *G06K 9/469* (2013.01); *G06K 9/6211* (2013.01);
(Continued)

(58) Field of Classification Search
CPC .. G06K 9/469; G06K 9/6892; G06K 9/00664; G06K 9/00771; G06K 9/6296;
(Continued)

(56) References Cited

U.S. PATENT DOCUMENTS 5,546,475 A    8/1996  Bolle et al.
6,556,983 B1*  4/2003  Altschuler ........... G06K 9/6296
                                                        706/55
(Continued)

FOREIGN PATENT DOCUMENTS

KR    10-0513735 B1    9/2005
KR    10-0587570 B1    6/2006
(Continued)

OTHER PUBLICATIONS

Gold, Steven, et al., "A Graduated Assignment Algorithm for Graph Matching," *IEEE Transactions on Pattern Analysis and Machine Intelligence*, vol. 18, Issue 4, Apr. 1996, pp. 377-388 (12 pages in English).

(Continued)

*Primary Examiner* — Santiago Garcia
(74) *Attorney, Agent, or Firm* — NSIP Law

(57) ABSTRACT

A processor-implemented method includes acquiring, by a processor, a first undirected graph and a second undirected graph, generating, by the processor, a first lattice for the first undirected graph and a second lattice for the second undirected graph; matching, by the processor, the first lattice and the second lattice based on a first global structure of the first lattice and a second global structure of the second lattice, the first global structure corresponding to nodes of the first undirected graph and the second global structure corresponding to nodes of the second undirected graph, and processing the first undirected graph and the second undirected graph based on a result of the matching of the first lattice and the second lattice.

19 Claims, 11 Drawing Sheets

(51) Int. Cl.
  *G06K 9/46* (2006.01)
  *G06K 9/68* (2006.01)
  *G06T 11/60* (2006.01)

(52) U.S. Cl.
  CPC ......... *G06K 9/6215* (2013.01); *G06K 9/6232* (2013.01); *G06K 9/6251* (2013.01); *G06K 9/6296* (2013.01); *G06K 9/6892* (2013.01); *G06T 11/60* (2013.01)

(58) Field of Classification Search
  CPC .. G06K 9/6215; G06K 9/6232; G06K 9/6251; G06K 9/00369; G06K 9/3233; G06K 9/6202; G06K 9/6256; G06K 9/6267; G06K 9/6224; G06K 9/00147; G06K 9/00127; G06T 2207/20124; G06T 7/12; G06T 7/246; G06T 7/74; G06T 11/206; G06T 2207/20072; G06T 7/162; G06T 11/60; G06T 7/11; G06T 7/143; G06F 9/4498; G06F 16/248; G06F 16/583; G06F 16/9024; G06N 3/02; G06N 20/00; G06N 5/047; H04L 67/10; G06Q 30/06
  USPC ....... 382/103, 110, 164, 190, 209, 165, 170, 382/173; 345/683
  See application file for complete search history.

(56) References Cited

U.S. PATENT DOCUMENTS

| | | | | |
|---|---|---|---|---|
| 7,684,389 | B2* | 3/2010 | Beshai | G06F 15/17381 |
| | | | | 370/387 |
| 8,866,845 | B2 | 10/2014 | Leung et al. | |
| 8,872,830 | B2* | 10/2014 | Saund | G06T 11/206 |
| | | | | 345/440 |
| 9,349,076 | B1* | 5/2016 | Liu | G06K 9/00369 |
| 2006/0214932 | A1* | 9/2006 | Grady | G06K 9/342 |
| | | | | 345/440 |
| 2007/0165949 | A1* | 7/2007 | Sinop | G06T 7/194 |
| | | | | 382/173 |
| 2007/0201632 | A1* | 8/2007 | Ionescu | H04L 1/0631 |
| | | | | 379/88.01 |
| 2008/0260257 | A1* | 10/2008 | Rose | G06K 9/00973 |
| | | | | 382/195 |
| 2011/0221769 | A1 | 9/2011 | Leung et al. | |
| 2012/0069024 | A1* | 3/2012 | Saund | G06T 11/206 |
| | | | | 345/440 |
| 2012/0070091 | A1* | 3/2012 | Saund | G06K 9/00449 |
| | | | | 382/225 |
| 2012/0113121 | A1* | 5/2012 | Luo | G06F 16/58 |
| | | | | 345/440 |
| 2013/0335422 | A1* | 12/2013 | Saund | G06T 11/206 |
| | | | | 345/440 |
| 2013/0336580 | A1* | 12/2013 | Saund | G06K 9/6892 |
| | | | | 382/159 |
| 2014/0072195 | A1* | 3/2014 | Zhang | G06T 7/0012 |
| | | | | 382/129 |
| 2014/0236963 | A1* | 8/2014 | Drake | G06F 16/56 |
| | | | | 707/747 |
| 2016/0110911 | A1* | 4/2016 | Frank | A61B 5/0042 |
| | | | | 382/131 |
| 2016/0365416 | A1* | 12/2016 | Metz | H01L 21/02546 |
| 2017/0169573 | A1* | 6/2017 | Ren | G06T 7/162 |
| 2017/0213089 | A1* | 7/2017 | Chen | G06K 9/00771 |
| 2017/0371811 | A1* | 12/2017 | Noyes | G06F 9/4498 |
| 2018/0211205 | A1* | 7/2018 | Takemoto | G06T 11/60 |

FOREIGN PATENT DOCUMENTS

| | | |
|---|---|---|
| KR | 10-1037759 B1 | 5/2011 |
| KR | 10-1302573 B1 | 9/2013 |
| KR | 10-1563238 B1 | 11/2015 |
| KR | 10-1747854 B1 | 6/2017 |
| KR | 10-1878844 B1 | 7/2018 |

OTHER PUBLICATIONS

Leordeanu, Marius, et al., "A Spectral Technique for Correspondence Probiems Using Pairwise Constraints," *Proceedings of the 10th IEEE International Conference on Computer Vision*, Oct. 2005 (8 pages in English).

Torresani, Lorenzo, et al., "Feature Correspondence via Graph Matching: Models and Global Optimization," *Proceedings of the 10th European Conference on Computer Vision*, Marseille, France, Oct. 2008 (24 pages in English).

Leordeanu, Marius, et al., "An Integer Projected Fixed Point Method for Graph Matching and MAP Inference," *Proceedings of the 22nd International Conference on Neural Information Processing Systems*, Vancouver, Canada, Dec. 2009 (9 pages in English).

Cho, Minsu, et al., "Reweighted Random Walks for Graph Matching," *Proceedings of the European Conference on Computer Vision*, Crete, Greece, Sep. 2010 (14 pages in English).

Zhou, Feng, et al,. "Factorized Graph Matching," *IEEE Transactions on Pattern Analysis and Machine Intelligence*, vol. 38, Issue 9, Sep. 2016 (15 pages in English).

Ma, Jiayi, et al., "Non-Rigid Point Set Registration by Preserving Global and Local Structures," *IEEE Transactions on Image Processing*, vol. 25, Issue 1, Jan. 2016, pp. 53-64 (29 pages in English).

Jiang, Bo, et al. "Binary Constraint Preserving Graph Matching.", *Proceedings of the IEEE Conference on Computer Vision and Pattern Recognition*, Honolulu, HI, USA, Jul. 2017 (8 pages in English).

* cited by examiner

METHOD AND APPARATUS FOR PROCESSING A PLURALITY OF UNDIRECTED GRAPHS

CROSS-REFERENCE TO RELATED APPLICATIONS

This application claims the benefit under 35 USC § 119(a) of Chinese Patent Application No. 201711124245.5, filed on Nov. 14, 2017, in the State Intellectual Property Office of China, and Korean Patent Application No. 10-2018-0091157, filed on Aug. 6, 2018, in the Korean Intellectual Property Office, the entire disclosures of which are incorporated herein by reference for all purposes.

BACKGROUND

1. Field

The following description relates to a method and apparatus for processing a plurality of undirected graphs.

2. Description of Related Art

In graphs which each including a plurality of nodes, a graph in which edges between nodes (or vertices) have no orientation is called an "undirected graph." Undirected graph models are widely used in various fields, and may represent various relationships. For example, an implementation which matches a plurality of undirected graphs may be used in image synthesis technology, or posture analysis technology of an object in an image.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a processor-implemented method includes acquiring, by a processor, a first undirected graph and a second undirected graph, generating, by the processor, a first lattice for the first undirected graph and a second lattice for the second undirected graph; matching, by the processor, the first lattice and the second lattice based on a first global structure of the first lattice and a second global structure of the second lattice, the first global structure corresponding to nodes of the first undirected graph and the second global structure corresponding to nodes of the second undirected graph, and processing the first undirected graph and the second undirected graph based on a result of the matching of the first lattice and the second lattice.

The first lattice and the second lattice may represent features of edges and nodes of the first undirected graph and the second undirected graph, as coordinates, respectively.

The generating of the first lattice and the generating of the second lattice may include generating the first lattice based on a non-metric multidimensional scaling (NMDS), and generating the second lattice based on the NMDS.

The generating of the first lattice based on the NMDS may include randomly generating a target lattice, and generating the first lattice by optimizing the target lattice based on features of edges and nodes of the first undirected graph.

The generating of the first lattice by optimizing the target lattice may include calculating a distance between a first point and a second point within the target lattice, the first point and the second point respectively corresponding to a first node and a second node of the first undirected graph, converting a feature of an edge between the first node and the second node to the distance between the first point and the second point based on a monotone function that does not include a parameter, calculating a Kruskal's stress-1 for the target lattice, and determining the target lattice to be the first lattice in response to a converging of the calculated Kruskal's stress-1.

The monotone function may be determined by minimizing the following expression: $\Sigma_{i,j}(r(w_{ij}^t)-d_{ij}^t)^2$, in which $r(\bullet)$ denotes the monotone function, $w_{ij}^t$ denotes the feature of the edge between the first node and the second node, $d_{ij}^t$ denotes the distance between the first point and the second point, and i and j denote numerals within a total number of nodes of the first undirected graph.

The Kruskal's stress-1 may be calculated based on the following equation:

$$\text{Kruskal's stress-1} = \sqrt{\frac{\Sigma_{i,j}(r(w_{ij}^t)-d_{ij}^t)^2}{\Sigma_{i,j}d_{ij}^{t2}}}.$$

The matching of the first lattice and the second lattice may include matching the first lattice and the second lattice based on a point set registration by preserving global and local structures (PR-GLS) algorithm.

The acquiring of the first undirected graph and the second undirected graph may include generating the first undirected graph from a first image, and generating the second undirected graph from a second image.

The processing of the first undirected graph and the second undirected graph may include synthesizing the first image and the second image based on the matching of the first lattice and the second lattice.

The first undirected graph and the second undirected graph may be associated with a same object, and the processing of the first undirected graph and the second undirected graph comprises analyzing a posture of the object.

In a general aspect, an apparatus includes a memory configured to store a program to process a plurality of undirected graphs, and a processor configured to execute the program, wherein the program is executed by the processor to: acquire a first undirected graph and a second undirected graph, generate a first lattice for the first undirected graph and a second lattice for the second undirected graph, match the first lattice and the second lattice based on a first global structure of the first lattice and a second global structure of the second lattice, the first global structure corresponding to nodes of the first undirected graph and the second global structure corresponding to nodes of the second undirected graph, and process the first undirected graph and the second undirected graph based on a result of the matching of the first lattice and the second lattice.

The first lattice and the second lattice may represent features of edges and nodes of the first undirected graph and the second undirected graph, as coordinates, respectively.

The generating of the first lattice and the generating of the second lattice may include generating the first lattice based on a non-metric multidimensional scaling (NMDS), and generating the second lattice based on the NMDS.

The matching of the first lattice and the second lattice may include matching the first lattice and the second lattice based on a point set registration by preserving global and local structures (PR-GLS) algorithm.

The acquiring of the first undirected graph and the second undirected graph may include generating the first undirected graph from a first image, and generating the second undirected graph from a second image.

The processing of the first undirected graph and the second undirected graph may include synthesizing the first image and the second image based on the matching of the first lattice and the second lattice.

The first undirected graph and the second undirected graph are associated with a same object, and the processing of the first undirected graph and the second undirected graph comprises analyzing a posture of the object.

Other features and aspects will be apparent from the following detailed description, the drawings, and the claims.

Figure 1:
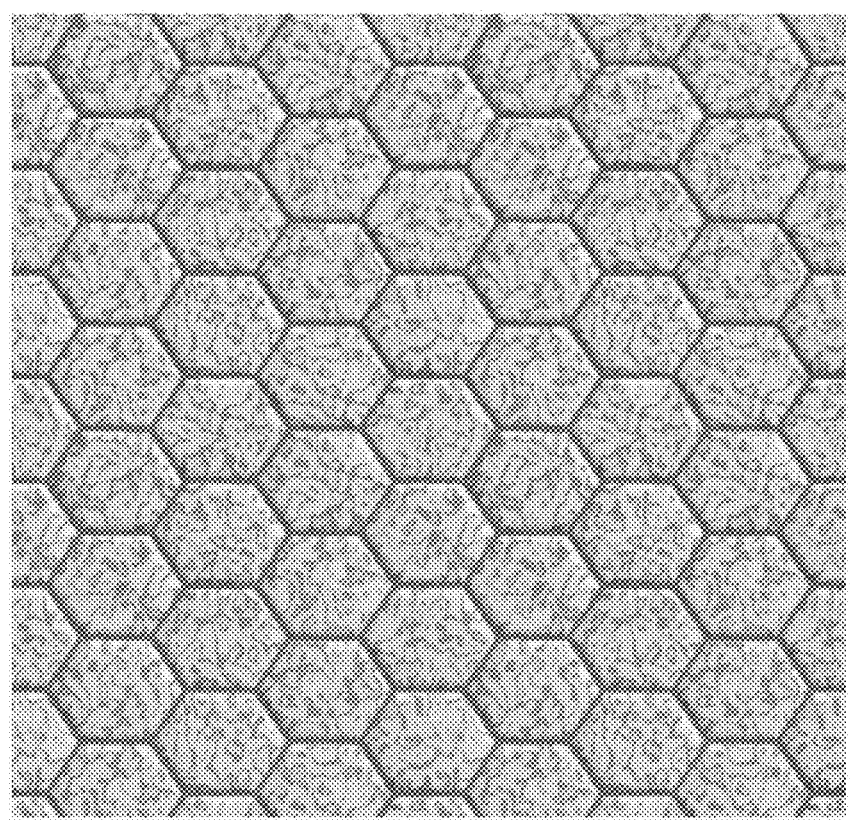
FIG. 1 illustrates an example of an image that includes a repeated pattern.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only and is not intended to be limiting of the present inventive concept. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, components or combinations thereof, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this disclosure pertains after an understanding of the present disclosure. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the description of examples, detailed description of well-known related structures or functions will be omitted when it is deemed that such description could cause ambiguous interpretation of the present disclosure.

Figure 2:
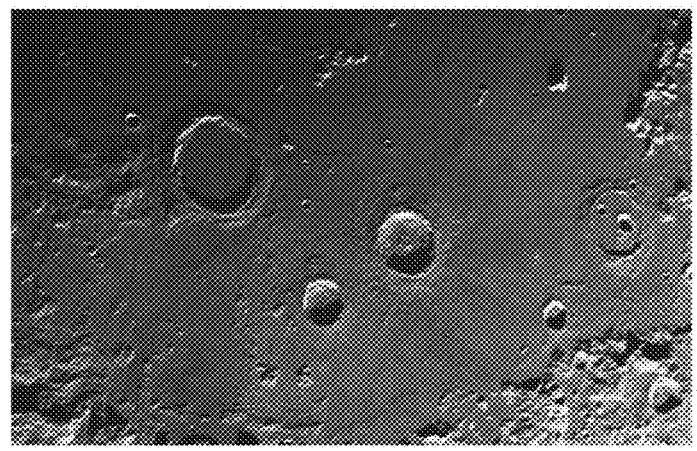
FIG. 2 illustrates an example of an image representing a scene with a slight change in a gray scale.

FIG. 1 illustrates an example of an image including a repeated pattern 100, and FIG. 2 illustrates an example of an image 200 representing a scene with a slight change in a gray scale.

A typical method of matching undirected graphs may influence the accuracy and efficiency of a result. For an image 100 including a repeated pattern as shown in FIG. 1, and an image 200 representing a scene with a slight change in a gray scale as shown in FIG. 2, it may be difficult to use a matching algorithm (for example, a scale-invariant feature transform (SIFT)) that employs local features of nodes. A matching algorithm that uses structure information between nodes may be used for the images of FIGS. 1 and 2. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

A quadratic assignment problem is a model of operations, and it may be difficult to obtain a solution to the quadratic assignment problem. For example, in a method of matching undirected graphs, a problem of matching undirected graphs is expressed as a quadratic assignment problem and an approximate solution to the quadratic assignment problem is obtained. An undirected graph is, for example, a graph model G, and the graph model G includes a node V and an edge E that does not have an orientation. The node V has a corresponding feature F, and the edge E has a corresponding feature W. A problem of matching two undirected graphs is converted to a problem of matching nodes and edges of each of the undirected graphs. The quadratic assignment problem maximizes a similarity between features of matching nodes and edges of two undirected graphs through an optimization of a target function.

<Optimization of Quadratic Assignment Problem>

Hereinafter, an optimization of a quadratic assignment problem for matching of a template undirected graph and a scene undirected graph is described.

The template undirected graph is expressed as $G^t=\{V^t,E^t,F_1^t,W^t\}$. $V^t=\{v_i\}_{i=1}^M$ denotes a set of "M" nodes forming the template undirected graph, $E^t=\{e_{ij}\}_{i,j=1}^M$ denotes a set of edges, each between an arbitrary two nodes among the "M" nodes, $F_1^t=\{f_i^t\}_{i=1}^M$ denotes a set of features $f_i^t$ of nodes $v_i^t$, and $W^t=\{w_{ij}^t\}_{i,j=1}^M$ denotes a set of features $w_{ij}^t$ of edges $e_{ij}^t$. For example, a feature of a node is shape context, and a feature of an edge is a length of the edge.

Similar to the template undirected graph, the scene undirected graph is expressed as $G^s=\{V^s,E^s,F^s,W^s\}$. The scene undirected graph is, for example, a set of "N" nodes.

For example, "N" is greater than or equal to "M." In this example, a node (that is, an external node) among the nodes of the scene undirected graph may not correspond to a node of the template undirected graph. The external node allows a matching algorithm to be unstable, and reduces an accuracy of a matching result. Thus, to increase a robustness of external nodes of the scene undirected graph in a matching process, "N-M" virtual nodes are added to the template undirected graph $G^t$.

A matching algorithm optimizes a corresponding relationship between the template undirected graph $G^t$ and the scene undirected graph $G^s$. Generally, a matching algorithm optimizes a quadratic assignment problem shown below.

$$\min_x x^T Kx,$$
$$\text{s.t. } 1^T X = 1^T, X1 = 1, X \in \{0, 1\}^{N \times N},$$

Equation 1

In Equation 1, x denotes a vector acquired by combining column vectors of a matrix X, and $X_{ij}=1$ indicates that an i-th node of the template undirected graph is matched to a j-th node of the scene undirected graph. 1 denotes a column vector with all elements of "1." Also, $K_{ij;kl}$ denotes an element at an ((i-1)N+j)-th row and a ((k-1)N+l)-th column of a matrix K, and refers to a dissimilarity between features $w_{ik}^t$ and $w_{jl}^s$. $K_{ij;kl}$ has a value of "0" and "1" and a form of a value indicated by the $K_{ij;kl}$ changes based on a nature and type of a feature. In an example, $K_{ij;kl}$ has a discrete value of "0" or "1." In another example, $K_{ij;kl}$ has a real number between "0" and "1". s.t. indicates that the quadratic assignment problem should satisfy conditions listed next to the quadratic assignment problem.

Since it may be difficult to obtain a solution to the quadratic assignment problem, an algorithm that may find an optimum solution of a target function within a short period of time does not exist. An existing algorithm that is being used is a similar solution to the quadratic assignment problem, however, a matching result acquired by the existing algorithm has a relatively low accuracy and the existing algorithm has a relatively high complexity. Also, in an example of matching undirected graphs that have severe noise or polluted outliers, and an example of matching relatively large undirected graphs, it may be difficult to obtain an optimum solution of a target function using the existing algorithm.

Hereinafter, a method of efficiently and accurately matching a plurality of undirected graphs and processing the plurality of undirected graphs that are matched is described in detail with reference to FIGS. 3 through 15.

Figure 3:
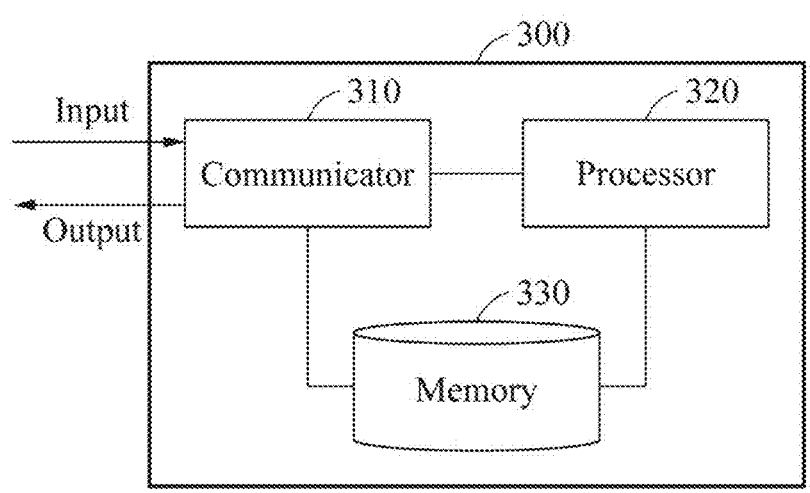
FIG. 3 illustrates an example of a configuration of an undirected graph processing apparatus.

FIG. 3 illustrates an example of a configuration of an undirected graph processing apparatus 300.

The undirected graph processing apparatus 300 may include a communicator 310, a processor 320, and a memory 330. For example, the undirected graph processing apparatus 300 may be an electronic apparatus, and the electronic apparatus may include, but is not limited to, for example, a server, a personal computer (PC), or a mobile device.

The communicator 310 is connected to the processor 320 and the memory 330, and is configured to transmit and receive data to and from the processor 320 and the memory 330. Also, the communicator 310 may be connected to an external device, and may be configured to transmit and receive data to and from the external device.

The communicator 310 may be implemented, for example, as a circuitry in the undirected graph processing apparatus 300. In an example, the communicator 310 may include an internal bus and an external bus. In another example, the communicator 310 may be a device configured to connect the undirected graph processing apparatus 300 to an external device. In this example, the communicator 310 is, for example, an interface. The communicator 310 may receive data from the external device and transmit data to the processor 320 and the memory 330.

The processor 320 is configured to process data received by the communicator 310 and data stored in, and received from, the memory 330. The term "processor," as used herein, may be a hardware-implemented data processing device having a circuit that is physically structured to execute desired operations. For example, the desired operations may include code or instructions included in a program. The hardware-implemented data processing device may include, but is not limited to, for example, a microprocessor, a central processing unit (CPU), a processor core, a multi-core processor, a multiprocessor, an application-specific integrated circuit (ASIC), and a field-programmable gate array (FPGA).

The processor 320 executes a computer-readable code (for example, software) stored in a memory (for example, the memory 330), and executes instructions caused by the processor 320.

The memory 330 is configured to store data received by the communicator 310 and data processed by the processor 320. For example, the memory 330 stores a program. The stored program is coded to process a plurality of undirected graphs, and may be a set of syntax executable by the processor 320.

The memory 330 includes, for example, any one or any combination of a volatile memory, a nonvolatile memory, a random access memory (RAM), a flash memory, a hard disk drive and an optical disc drive.

The memory 330 stores an instruction set (for example, software) to operate the undirected graph processing apparatus 300. The instruction set to operate the undirected graph processing apparatus 300 is executed by the processor 320.

The communicator 310, the processor 320 and the memory 330 will be further described below with reference to FIGS. 4 through 13.

Figure 4:
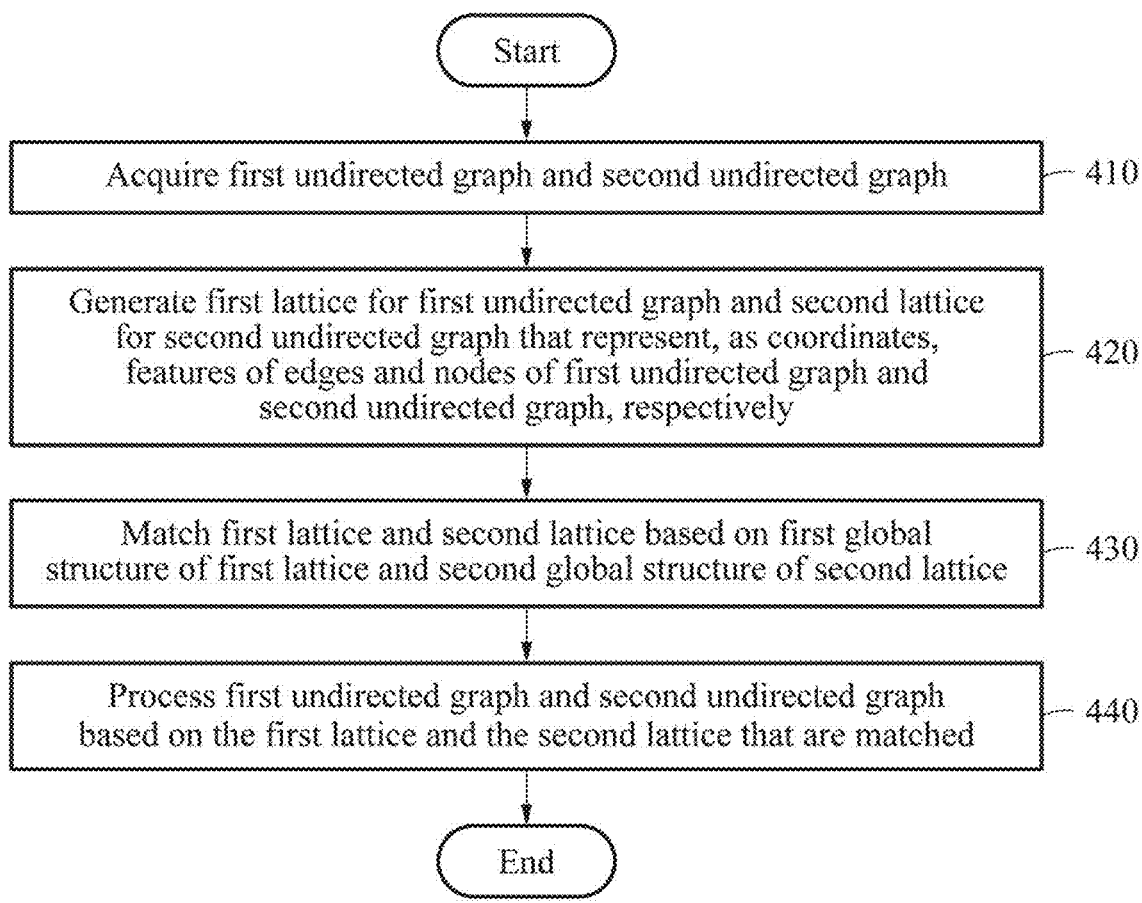
FIG. 4 is a flowchart illustrating an example of a method of processing a plurality of undirected graphs.

FIG. 4 is a flowchart illustrating an example of a method of processing a plurality of undirected graphs. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

The undirected graph processing apparatus 300 of FIG. 3 performs operations 410 through 440 of FIG. 4. In operations 410 through 440, a plurality of undirected graphs are matched and the matched undirected graphs are processed. An undirected graph is represented by a lattice, and a problem of matching a plurality of undirected graphs is converted to a problem of matching a plurality of lattices. When the problem of matching the plurality of undirected graphs is converted to the problem of matching the plurality of lattices, there is no need to obtain an optimum solution to a quadratic assignment problem, thereby reducing the complexity of calculations and increasing the accuracy of a result.

In operation 410, the undirected graph processing apparatus 300 (FIG. 3) acquires a first undirected graph and a second undirected graph. The first undirected graph and the second undirected graph are, for example, the above-described template undirected graph and the above-described scene undirected graph, respectively.

For example, the first undirected graph and the second undirected graph may be generated from a first image and a second image, respectively. An example of acquiring undirected graphs will be further described below with reference to FIG. 5.

In operation 420, the undirected graph processing apparatus 300 (FIG. 3) generates a first lattice for the first undirected graph, and generates a second lattice for the second undirected graph. A lattice represents, as coordinates, features of edges and nodes of an undirected graph.

A first lattice for a first undirected graph $G^t$ is expressed as $l^t = \{P^t, F_2^t\}$. $\mathcal{P}^t = \{p_i^t\}_{i=1}^n$ denotes a set of points $p_i^t$ within the first lattice, and points $p_i^t$ correspond to nodes $v_i^t$ of the first undirected graph. The points $p_i^t$ are related to features $f_i^t$ of the nodes $v_i^t$. $F_2^t$ denotes a set of features of edges between points within the first lattice. A feature of an edge between points $p_i^t$ and $p_j^t$ within the first lattice is expressed as a distance between the points $p_i^t$ and $p_j^t$. Similarly, a second lattice for a second undirected graph $G^s$ is expressed as $I^s = \{\mathcal{P}^s, F^s\}$.

An example of generating a first lattice and a second lattice will be further described below with reference to FIGS. 6, 7, and 8.

In operation 430, the undirected graph processing apparatus 300 (FIG. 3) matches the first lattice and the second lattice based on features of the first lattice and the second lattice. For example, the undirected graph processing apparatus 300 (FIG. 3) matches the first lattice and the second lattice based on a first global structure of the first lattice and a second global structure of the second lattice. For example, the first global structure of the first lattice is denoted by $\mathcal{P}^t$.

The first global structure $\mathcal{P}^t$ is represented using a Gaussian mixture model. In the Gaussian mixture model, a center of a Gaussian quantity is $T(\mathcal{P}^t)$. $T(\mathcal{P}^t)$ is, for example, a transformation of $\mathcal{P}^t$. A transformation includes, for example, a rotation of the first lattice and a mirror symmetry of the first lattice.

A second global structure $\mathcal{P}^s$ of the second lattice is regarded to be sampled from the Gaussian mixture model for the first global structure $\mathcal{P}^t$. For example, when an isotropic covariance $\sigma^2 I$ is assumed to be in all Gaussian quantities of the Gaussian mixture model, a probability of the second global structure $\mathcal{P}^s$ being acquired by sampling the Gaussian mixture model for the first global structure $\mathcal{P}^t$ is expressed as shown in Equation 2 below.

$$P(p_m^s \mid \theta) = \frac{\gamma}{a} + \sum_{n=1}^{N} \frac{(1-\gamma)\pi_{mn}}{2\pi\sigma^2} e^{-\frac{\|p_m^s - T(p_n^t)\|^2}{2\sigma^2}} \quad \text{Equation 2}$$

In Equation 2, a set $\theta = \{T, \sigma^2, \gamma\}$ includes parameters required to be optimized, and $\gamma$ denotes a percentage of an outlier. A distribution of outliers is assumed to be a uniform distribution, and a probability density function is assumed to be $$\frac{1}{a}.$$

N denotes a number of points in the first lattice. $\|\cdot\|$ denotes a Frobenius norm of a matrix. Equation 2 represents a probability of the second global structure $\mathcal{P}^s$ being acquired using an existing model. In Equation 2, a first term on a right side denotes a probability of a point of the second global structure $\mathcal{P}^s$ being an outlier, and a second term on the right side denotes a probability of the second global structure $\mathcal{P}^s$ being sampled from the Gaussian mixture model, and $\pi_{mn}$ denotes a membership probability of a Gaussian quantity and satisfies $\sum_{n=1}^{N} \pi_{mn} = 1$.

A local feature may be used to determine $\pi_{mn}$ of Equation 2.

It is assumed that a matrix A indicates a difference between local features of two lattices $\mathcal{P}^t$ and $\mathcal{P}^s$, and an element $A_{mn}$ in an i-th row and a j-th column of the matrix A indicates a dissimilarity between features $f_m^t \in F^t$ and $f_n^s \in F^s$. The two lattices $\mathcal{P}^t$ and $\mathcal{P}^s$ are matched by obtaining an optimum solution of one assignment problem based on the matrix A.

$$\min_{\mathcal{X}} A\mathcal{X}, \quad \text{Equation 3}$$
$$\text{s.t. } 1^T \mathcal{X} = 1^T, \mathcal{X} 1 = 1, \mathcal{X} \in \{0, 1\}^{N \times N},$$

In Equation 3, $X_{mn} = 1$ indicates matching of a point $p_m^t$ within the first lattice and a point $p_n^s$ within the second lattice. An assignment problem is solved to find a global optimum solution for $O(N^3)$ within a time complexity level, using a Hungarian algorithm.

When X is given, $\pi_{mn}$ is set as shown in Equation 4 below.

$$\pi_{mn} = \begin{cases} \tau, & X_{mn} = 1 \\ \frac{1-\tau}{N-1}, & X_{mn} = 0 \end{cases}, \quad \text{Equation 4}$$

T satisfies 0≤τ≤1, and a value of T may be set by a user. The value of T reflects a user confidence for a matching result. For example, when a user determines that a matching result of Equation 4 is relatively accurate, the value of T is set to a value close to "1," and otherwise, the value of T is set to a value close to "0." When the point $p_m^s$ in the second lattice is matched to the point $p_n^s$ in the first lattice, $$\pi_{mn} = \frac{1}{N}, \forall n \in N$$

is set.

A right side of Equation 2 represents global structures and local features. A point set registration by preserving global and local structures (hereinafter, referred to as "PR-GLS") algorithm allows a transformation T acquired using a prior probability for a parameter θ to be more smoothly performed. A prior probability density function for the transformation T is represented as shown in Equation 5 below.

$$P(\mathcal{T}) \propto e^{-\frac{\lambda}{2}\phi(\mathcal{T})},\qquad \text{Equation 5}$$

In Equation 5, λ is an integer, and may be set to, for example, "3." φ denotes a regularization function for one transformation T, and is in a form of $\phi(T)=\|T(\mathcal{P}^t)-\mathcal{P}^t\|_{\mathcal{H}}^2$, $\mathcal{H}$ denotes a reproducing kernel Hilbert space of one vector. The reproducing kernel Hilbert space is defined by one diagonal Gaussian matrix kernel function $$\Gamma(p_i^t, p_j^t) = \exp\left\{-\frac{\|p_i^t - p_j^t\|^2}{2\beta^2}\right\}I.$$

β denotes a standard difference between Gaussian kernel functions and is set to, for example, "2."

When Equations 2 and 5 are combined, a minus logarithm posterior probability is minimized. Thus, a maximum posterior probability (MAP) of θ is represented as shown in Equation 6 below.

$$\theta^* = \arg\min_\theta(-\Sigma_{m=1}^M \ln P(p_m^s|\theta) - \ln P(T)),\qquad \text{Equation 6:}$$

In Equation 6, sampling points are assumed to be independent of each other. A solution of the above problem is obtained using an expectation conditional maximization (ECM) method. An optimum solution of the transformation T is represented as shown in Equation 7 below.

$$T^*(p) = p + \Sigma_{n=1}^N \Gamma(p, p_n^t) c_n,\qquad \text{Equation 7:}$$

In Equation 7, $c_n$ denotes an n-th column vector of a matrix C. The matrix C is determined using Equation 8 shown below.

$$C(\Gamma g(1^T \mathcal{P}) + \lambda \sigma^2 I) = \mathcal{P}^s \mathcal{P} - \mathcal{P}^t g(1^T \mathcal{P}),\qquad \text{Equation 8}$$

In Equation 8, $\Gamma_{ij}$ denotes an element in an i-th row and a j-th column of a matrix Γ, and g(•) has a diagonal element of an input matrix to generate a new diagonal matrix. $\mathcal{P}$ denotes a posterior probability matrix, and an element in an i-th row and a j-th column is represented as shown in Equation 9 below.

$$\mathcal{P}_{mn} = \frac{\pi_{mn} e^{-\frac{\|p_m^s - T(p_n^t)\|^2}{2\sigma^2}}}{\sum_{k=1}^N \pi_{mk} e^{-\frac{\|p_m^s - T(p_k^t)\|^2}{2\sigma^2}} + \frac{\gamma(2\pi\sigma^2)^{D/2}}{(1-\gamma)a}}\qquad \text{Equation 9}$$

A transformation T to optimally match a first lattice and a second lattice using a point set registration by preserving global and local structures (PR-GLS) algorithm may be predicted, and a posterior probability defined in Equation 9 is calculated.

When a posterior probability $\mathcal{P}$ is relatively high, two corresponding points $p_m^t$ and $p_n^s$ in the first lattice and the second lattice may be matched to each other. For example, points of a plurality of second lattices may be matched to a point of one first lattice, or points of a plurality of first lattices may be matched to a point of one second lattice.

An assignment problem may be solved for one-to-one matching between a first lattice and a second lattice. To this end, a first transformed lattice T($\mathcal{P}^t$) and a second lattice $\mathcal{P}^s$ are described using shape context of points as local features. A dissimilar matrix S is calculated using $X^2$ test statistics. An element $s_{mn}$ of the dissimilar matrix S indicates a dissimilarity between shape context of points T($p_m^t$) and $p_n^s$. A one-to-one correspondence relationship between the first transformed lattice T($\mathcal{P}^t$) and the second lattice $\mathcal{P}^s$ is obtained by minimizing an assignment problem of Equation 10 shown below.

$$\min_M SM,\qquad \text{Equation 10}$$
$$\text{s.t. } 1^T M = 1^T, M1 = 1, M \in \{0,1\}^{N \times N},$$

In Equation 10, $M_{mn}=1$ indicates matching of points T($p_m^t$) and $p_n^s$. If $M_{mn}=1$, the points $p_m^t$ and $p_n^s$ are matched to each other.

<Parallel Processing of Algorithm>

When Equations 2 and 5 are combined, a solution of Equation 10 depends on an initial alignment between a first lattice $\mathcal{P}^t$ and a second lattice $\mathcal{P}^s$. An initial alignment of lattices is determined by coordinates of points $P_n^t$ and $P_n^s$. The coordinates of the points $p_n^t$ and $p_n^s$ may be rotated or inverted.

To acquire a higher matching accuracy, a plurality of first transformed lattices may be processed in parallel using a plurality of PR-GLS algorithms corresponding to the plurality of first transformed lattices. All the PR-GLS algorithms may be in different initial alignment states, and generate different matching results. For example, a solution of an inversion lattice $\mathcal{Q}^t = \{q_i^t | q_i^t = (x,-y), p_i^t = (x,y), p_i^t \in \mathcal{P}^t\}$ to a first lattice $I_i^t = \{\mathcal{P}_i^t, V^t\}$ is obtained first. $\mathcal{P}^t$ and $\mathcal{Q}^t$ are rotated based on Equation 11 shown below.

$$\begin{bmatrix} x \\ y \end{bmatrix} = \begin{bmatrix} x \\ y \end{bmatrix} \begin{bmatrix} \cos(\theta_i), & -\sin(\theta_i) \\ \sin(\theta_i), & \cos(\theta_i) \end{bmatrix},\qquad \text{Equation 11}$$

In Equation $\{\theta_i\}_{i=1}^h$ denotes angles uniformly distributed between 0 degrees and 360 degrees. Thus, "2h" transformed lattices $B^t = \{\mathcal{P}_i^t, \mathcal{Q}_i^t\}_{i=1}^h$ in total are acquired. Each transformed lattice $\mathcal{P}_i^t \in B$, $i \in \{1:2h\}$ is matched to the second lattice, and each matching result $M_i$ is acquired. The best matching result among acquired matching results is selected using Equation 12 shown below. A plurality of transformed lattices are simultaneously processed, and thus it is possible to save time.

$$M^* = \arg\min_{M \in \{M_i\}_{i=1}^{2h}} SM.$$ [Equation 12]

Returning to FIG. 4. in operation 440, the undirected graph processing apparatus 300 (FIG. 3) processes the first undirected graph and the second undirected graph based on the matching of the first lattice and the second lattice. In an example, when the first undirected graph and the second undirected graph are respectively generated from the first image and the second image, the first image and the second image are synthesized based on the matched first lattice and the second lattice. In another example, when the first undirected graph and the second undirected graph are associated with the same object, a posture of the object is analyzed. In addition to the above-described examples, various processing may be performed.

Figure 5:
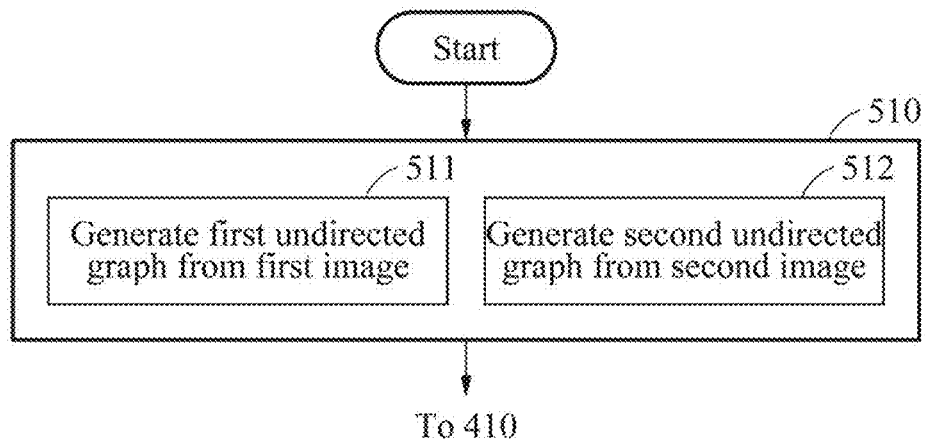
FIG. 5 is a flowchart illustrating an example of generating a first undirected graph and a second undirected graph.

FIG. 5 is a flowchart illustrating an example of generating a first undirected graph and a second undirected graph. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer that perform the specified functions, or combinations of special purpose hardware and computer instructions. In addition to the description of FIG. 5 below, the descriptions of FIGS. 1-4 are also applicable to FIG. 5, and are incorporated herein by reference. Thus, the above description may not be repeated here.

Referring to FIG. 5, operation 510 is performed before operation 410 of FIG. 4 is performed. Operation 510 includes operations 511 and 512. For example, operations 511 and 512 may be performed in parallel.

In operation 511, the undirected graph processing apparatus 300 generates a first undirected graph from a first image. For example, feature points of the first image are extracted, and nodes of the first undirected graph are generated based on the extracted feature points. Hereinafter, the undirected graph processing apparatus 300 refers to the undirected graph processing apparatus 300 illustrated in FIG. 3.

In operation 512, the undirected graph processing apparatus 300 generates a second undirected graph from a second image. In an example, the first image and the second image may be images acquired by capturing the same scene from different viewpoints. However, the captured image is not limited thereto. In another example, an object included in the first image may be identical to an object included in the second image, but locations or postures of the objects may be different from each other.

Figure 6:
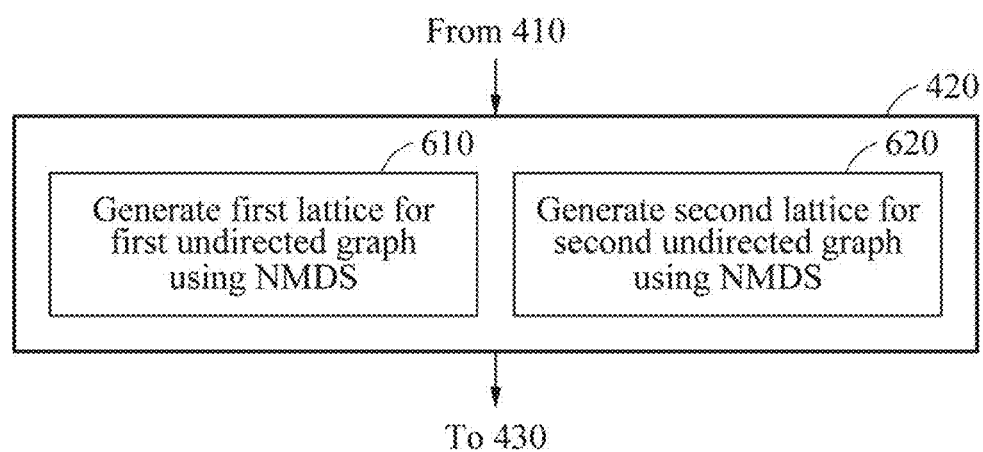
FIG. 6 is a flowchart illustrating an example of generating a first lattice and a second lattice using a non-metric multidimensional scaling (NMDS).

FIG. 6 is a flowchart illustrating an example of generating a first lattice and a second lattice using a non-metric multidimensional scaling (NMDS). The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer that perform the specified functions, or combinations of special purpose hardware and computer instructions. In addition to the description of FIG. 6 below, the descriptions of FIGS. 1-5 are also applicable to FIG. 6, and are incorporated herein by reference. Thus, the above description may not be repeated here.

Referring to FIG. 6, operation 420 of FIG. 4 includes operations 610 and 620.

In operation 610, the undirected graph processing apparatus 300 generates a first lattice for the first undirected graph using an NMDS. The NMDS is properly applied to an undirected graph. Since the NMDS has few assumptions about data and is applicable to a relatively wide range, the NMDS allows a dissimilarity between nodes to be quantified using an arbitrary method. An example of generating the first lattice using the NMDS will be further described below with reference to FIGS. 7 and 8.

In operation 620, the undirected graph processing apparatus 300 generates a second lattice for the second undirected graph using the NMDS.

Figure 7:
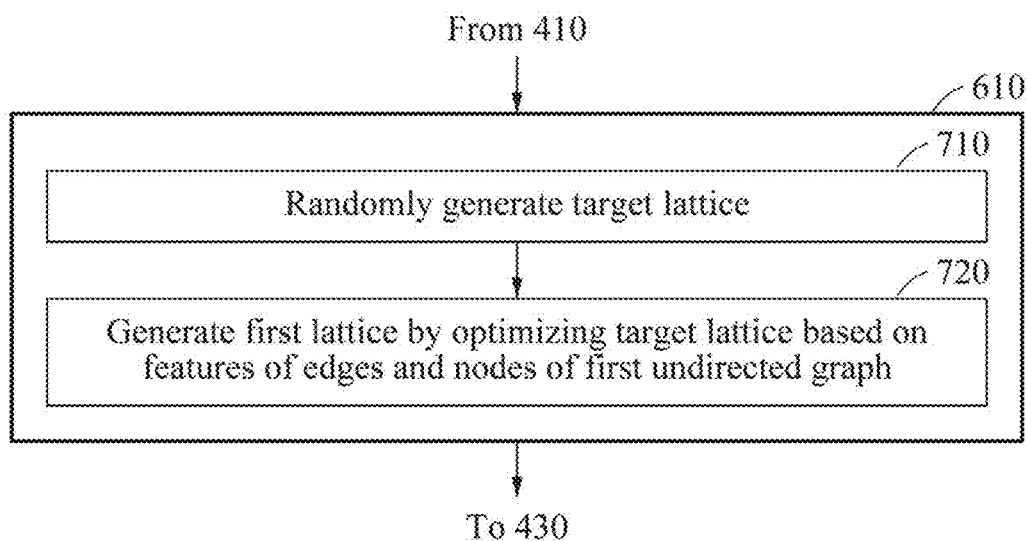
FIG. 7 is a flowchart illustrating an example of generating a first lattice based on a target lattice.

FIG. 7 is a flowchart illustrating an example of generating a first lattice based on a target lattice. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer that perform the specified functions, or combinations of special purpose hardware and computer instructions. In addition to the description of FIG. 7 below, the descriptions of FIGS. 1-6 are also applicable to FIG. 7, and are incorporated herein by reference. Thus, the above description may not be repeated here.

Referring to FIG. 7, operation 610 of FIG. 6 includes operations 710 and 720.

In operation 710, the undirected graph processing apparatus 300 may randomly generate a target lattice. For example, the undirected graph processing apparatus 300 generates a target lattice $\{p_i^t\}_{i=1}^N$ using the NMDS.

In operation 720, the undirected graph processing apparatus 300 may generate the first lattice by optimizing the target lattice based on features of edges and nodes of the first undirected graph. An example of optimizing a target lattice will be further described below with reference to FIG. 8.

Figure 8:
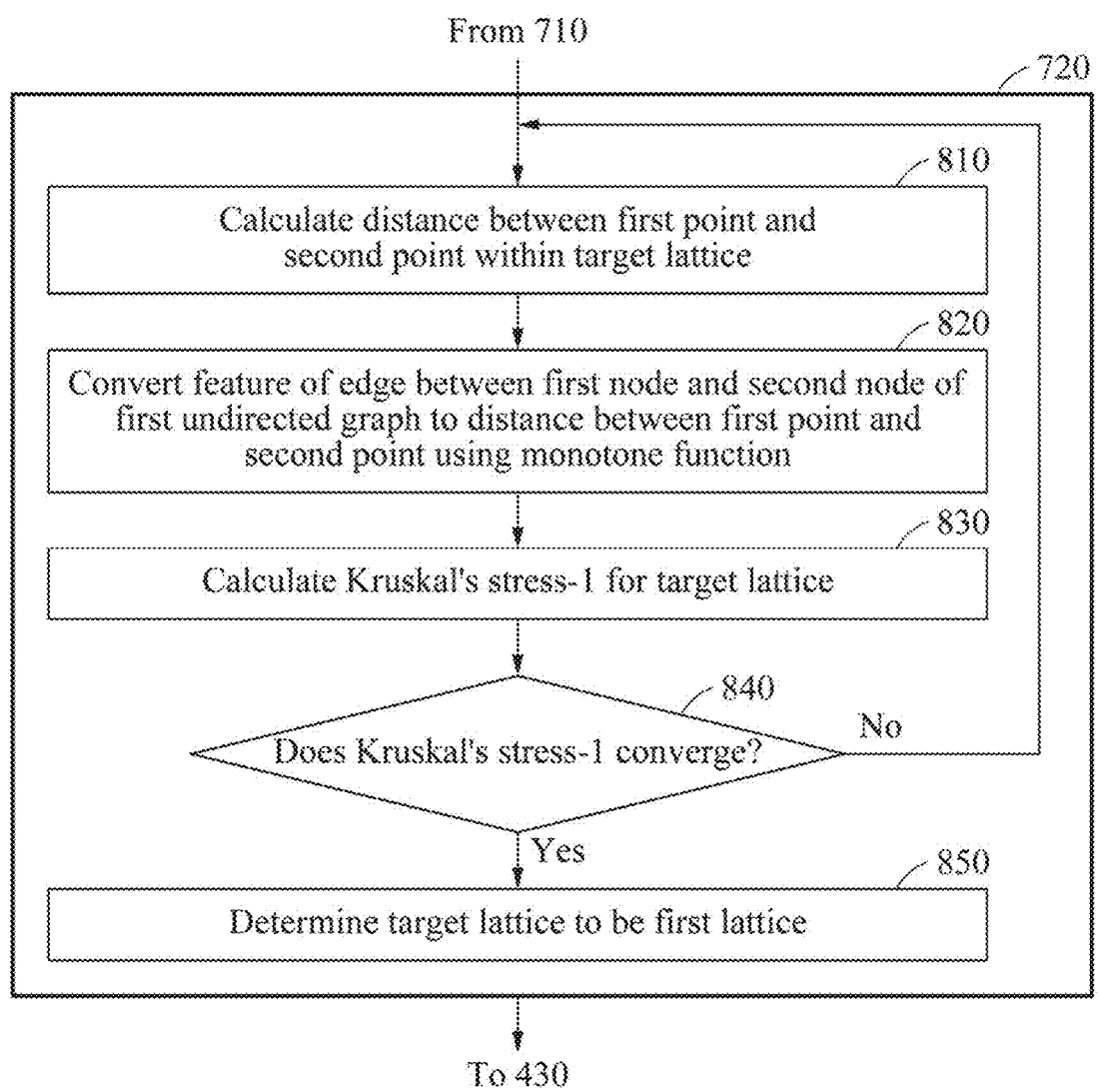
FIG. 8 is a flowchart illustrating an example of generating a first lattice by optimizing a target lattice.

FIG. 8 is a flowchart illustrating an example of generating a first lattice by optimizing a target lattice. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer that perform the specified functions, or combinations of special purpose hardware and computer instructions. In addition to the description of FIG. 8 below, the descriptions of FIGS. 1-7 are also applicable to FIG. 8, and are incorporated herein by reference. Thus, the above description may not be repeated here.

Referring to FIG. 8, operation 720 of FIG. 7 includes operations 810 through 850.

In operation 810, the undirected graph processing apparatus 300 calculates a distance $\{d_{ij}^t\}_{i,j=1}^N$ between a first point $p_i^t$ and a second point $p_j^t$ within the target lattice. The first point and the second point are two arbitrary points within the target lattice. Because the first lattice is generated by optimizing the target lattice, a notation of the target lattice is identical to a notation of the first lattice.

In operation 820, the undirected graph processing apparatus 300 converts a feature $w_{ij}^t$ of an edge between a first node $v_i^t$ and a second node $v_j^t$ of the first undirected graph to a distance $d_{ij}^t$ between the first point $p_i^t$ and the second point $p_j^t$ using a monotone function $r(\bullet)$. The first node $v_i^t$ and the second node $v_j^t$ of the first undirected graph respectively correspond to the first point $p_i^t$ and the second point $p_j^t$ within the target lattice. For example, the monotone function $r(\bullet)$ may not include a parameter and may be acquired by minimizing $\Sigma_{i,j}(r(w_{ij}^t)-d_{ij}^t)^2$.

In operation 830, the undirected graph processing apparatus 300 calculates a Kruskal's stress-1 for the target lattice. The undirected graph processing apparatus 300 minimizes the Kruskal's stress-1 represented by Equation 13 shown below.

$$\text{Kruskal's stress-1} = \sqrt{\frac{\Sigma_{i,j}(r(w_{ij}^t)-d_{ij}^t)^2}{\Sigma_{i,j}d_{ij}^{t2}}} \quad \text{Equation 13}$$

In operation 840, the undirected graph processing apparatus 300 determines whether the calculated Kruskal's stress-1 converges. For example, the undirected graph processing apparatus 300 calculates a difference between the Kruskal's stress-1 calculated in operation 830 and a Kruskal's stress-1 that is calculated in advance. When the calculated difference is within a predetermined threshold, the undirected graph processing apparatus 300 determines that the calculated Kruskal's stress-1 converges.

When the Kruskal's stress-1 does not converge, operations 810 through 830 are repeated.

In operation 850, the undirected graph processing apparatus 300 determines the target lattice to be the first lattice in response to the calculated Kruskal's stress-1 converging.

Although the first lattice is generated through operations 810 through 850 as described above, examples are not limited thereto. Thus, the description of operations 810 through 850 is also applicable to an example of generating a second lattice.

Figure 9:
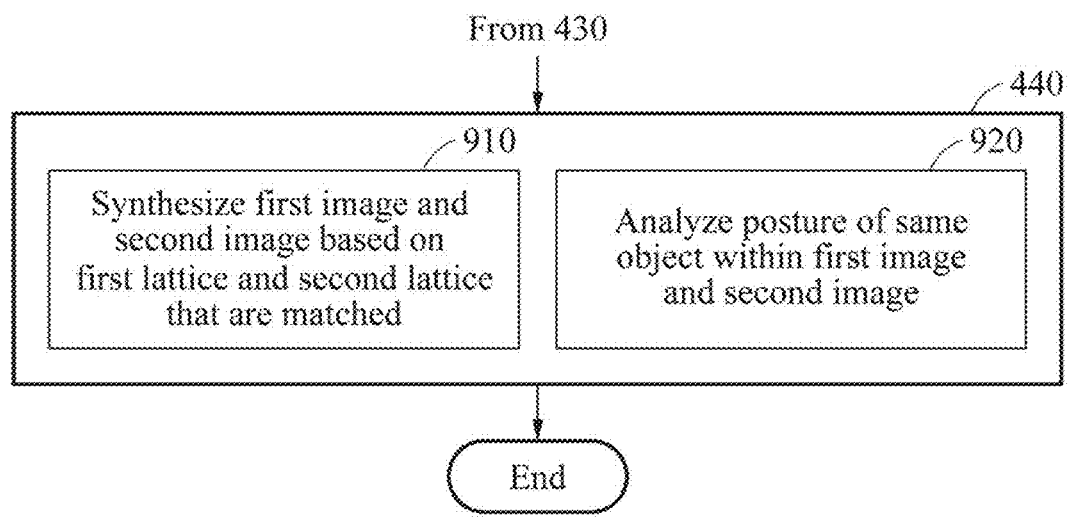
FIG. 9 is a flowchart illustrating an example of processing a first undirected graph and a second undirected graph.

FIG. 9 is a flowchart illustrating an example of processing a first undirected graph and a second undirected graph. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. One or more blocks of FIG. 9, and combinations of the blocks, can be implemented by special purpose hardware-based computer that perform the specified functions, or combinations of special purpose hardware and computer instructions. In addition to the description of FIG. 9 below, the descriptions of FIGS. 1-8 are also applicable to FIG. 9, and are incorporated herein by reference. Thus, the above description may not be repeated here.

Referring to FIG. 9, operation 440 of FIG. 4 includes operations 910 and 920. Depending on examples, operations 910 and 920 are selectively performed.

In operation 910, the undirected graph processing apparatus 300 synthesizes the first image and the second image based on the matched first lattice and second lattice. Matching of the first lattice and the second lattice indicates matching of the first undirected graph and the second undirected graph. Also, the matching of the first undirected graph and the second undirected graph indicates matching of identical or corresponding portions between the first image of the first undirected graph and the second image of the second undirected graph. The undirected graph processing apparatus 300 generates a synthesized image based on a portion of each of the matched first image and second image. In an example, the synthesized image may be a panoramic image. In another example, the synthesized image may be a medical image.

In operation 920, the undirected graph processing apparatus 300 analyzes a location and a posture of the same object within the first image and the second image, based on the matched first lattice and second lattice. For example, the first lattice is associated with an object included in the first image, and the second lattice is associated with an object included in the second image. The matching of the first lattice and the second lattice indicates matching of the object in the first image and the object in the second image.

For example, an analysis of a location or a posture of an object may be applicable to an autonomous driving technology. Based on images captured by an autonomous vehicle, locations or postures of objects included in the images are analyzed. For example, when posture data of an object in a temporally preceding first image is known, posture data of an object in a second image that is temporally subsequent to the first image is predicted.

Figure 10:
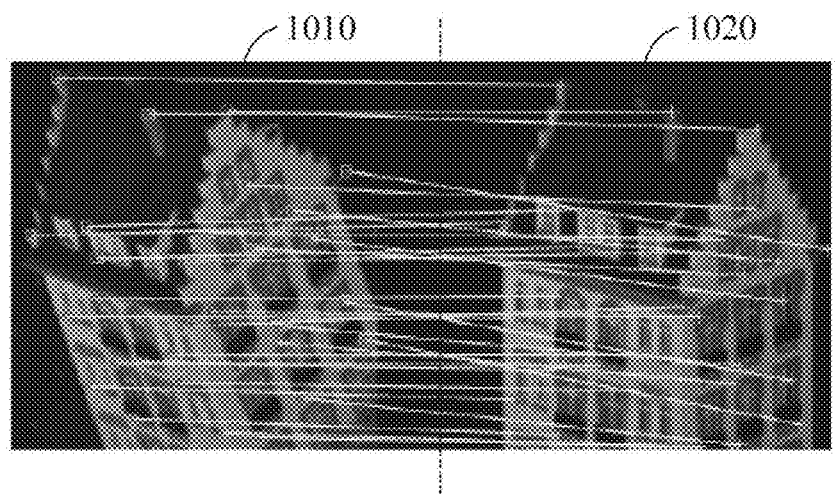
FIGS. 10, 11 and 12 illustrate examples of a first undirected graph and a second undirected graph that are matched.
Figure 11:
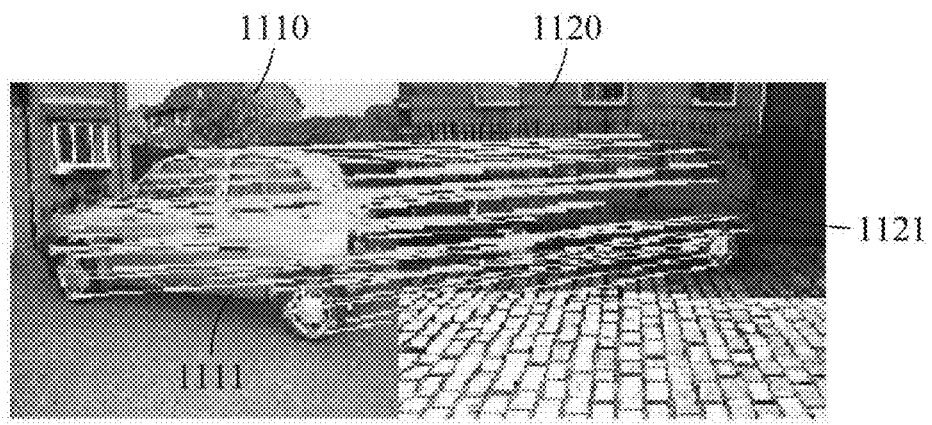
Figure 12:
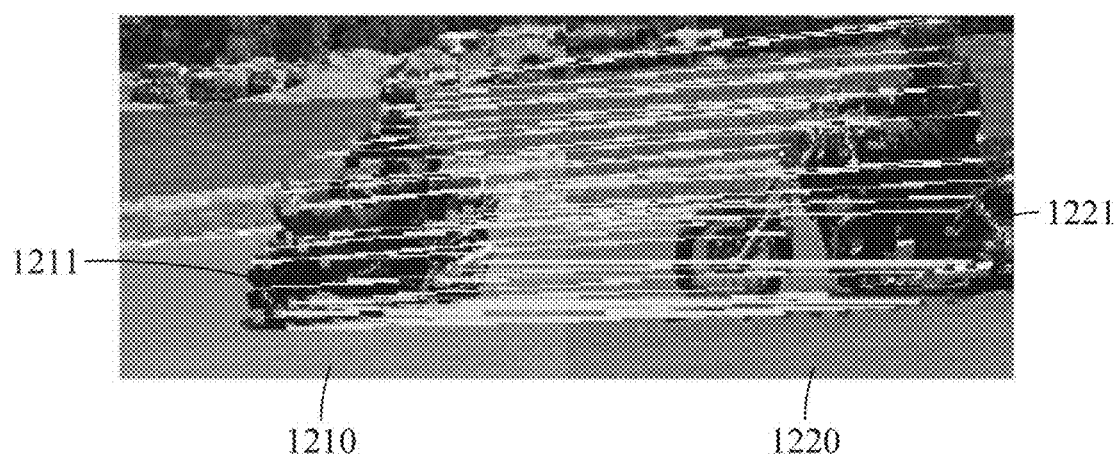

FIGS. 10, 11 and 12 illustrate examples of a matched first undirected graph and a second undirected graph.

FIGS. 10 and 11 respectively illustrate first images 1010 and 1110 and second images 1020 and 1120. The first image 1010 and the second image 1020 as illustrated in FIG. 10 may include the same objects, and the first image 1110 and the second image 1120 as illustrated in FIG. 11 may include the same objects 1111 and 1121. A first undirected graph and a second undirected graph are generated based on nodes extracted from the object, and are matched using the above-described method.

FIG. 12 illustrates a first image 1210 and a second image 1220 that include the same objects 1211 and 1221 with different postures. An object 1211 in the first image 1210 may be identical to an object 1221 in the second image 1220. However, postures of the objects 1211 and 1221 may be different from each other. Despite different postures of the objects 1211 and 1221, the objects 1211 and 1221 are matched to each other based on an undirected graph of the object 1211 and an undirected graph of the object 1221.

Figure 13:
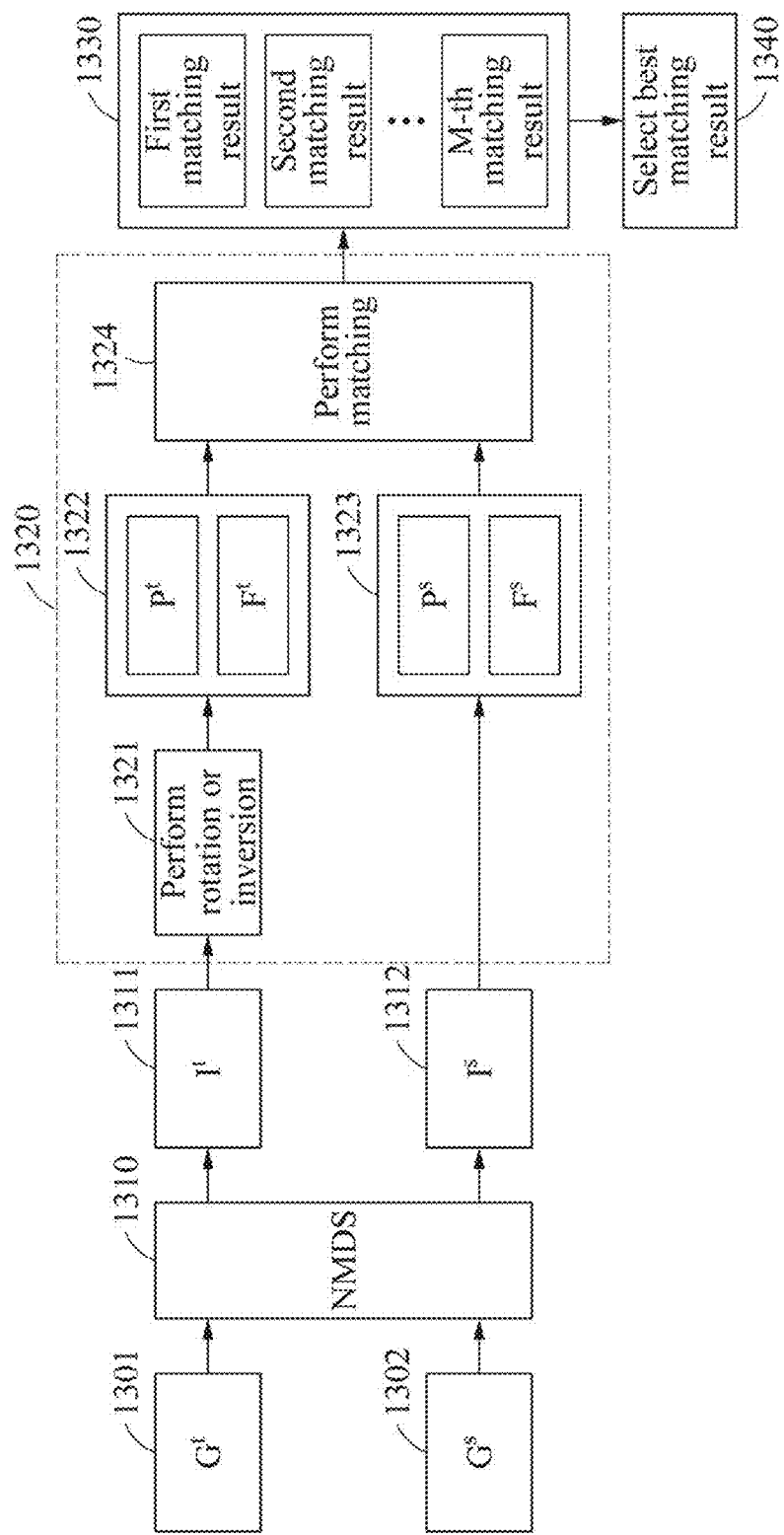
FIG. 13 is a flowchart illustrating an example of a method of matching a first undirected graph and a second undirected graph.

FIG. 13 is a flowchart illustrating an example of a method of matching a first undirected graph and a second undirected graph. The operations in FIG. 13 may be performed in the sequence and manner as shown, although the order of some operations may be changed or some of the operations omitted without departing from the spirit and scope of the illustrative examples described. Many of the operations shown in FIG. 13 may be performed in parallel or concurrently. One or more blocks of FIG. 13, and combinations of the blocks, can be implemented by special purpose hardware-based computer that perform the specified functions, or combinations of special purpose hardware and computer instructions. In addition to the description of FIG. 13 below, the descriptions of FIGS. 1-12 are also applicable to FIG. 13, and are incorporated herein by reference. Thus, the above description may not be repeated here.

Referring to FIG. 13, a first undirected graph $G^r$ is acquired from a first image in operation 1301, and a second undirected graph $G^s$ is acquired from a second image in operation 1302.

By applying an NMDS to the first undirected graph $G^r$ and the second undirected graph $G^s$ in operation 1310, a first lattice $l^r$ is generated in operation 1311 and a second lattice $l^s$ is generated in operation 1312.

In operation 1321, the first lattice $l^r$ is transformed.

A global structure $P^r$ and a local feature $F^r$ of the first transformed lattice $l^r$ are calculated in operation 1322, and a global structure $P^s$ and a local feature $F^s$ of the second lattice $l^s$ are calculated in operation 1323. In operation 1324, the first lattice $l^r$ and the second lattice $l^s$ are matched based on the calculated global structures $P^r$ and $P^s$.

Operation 1320 including operations 1321, 1322, 1323 and 1324, is repeatedly performed, so that the first transformed lattice $l^r$ and the second lattice $l^s$ are variously matched.

A plurality of matching results are calculated in operation 1330, and the best matching result is selected from the plurality of calculated matching results in operation 1340.

<Algorithm Time Complexity>

Time complexity of the above-described undirected graph matching method is denoted by $O(N^3)$ in which N denotes a number of nodes in a first undirected graph. For example, an NMDS is used to convert one undirected graph to one lattice based on the time complexity $O(N^3)$. A PR-GLS algorithm may be used to match two lattices based on the time complexity $O(N^3)$. For example, when two undirected graphs are provided, the PR-GLS algorithm is performed "2h" times, to acquire an optimal matching accuracy. In this example, h controls a balance between an accuracy and an efficiency. PR-GLS algorithms may be executed in parallel.

An execution complexity of an existing undirected graph matching method is generally denoted by $O(N^4)$, and a calculation of Equation 1 is required. In comparison to the typical undirected graph matching method, the undirected graph matching method in the examples disclosed above with reference to FIGS. 3 through 13 may have a relatively low time complexity.

Figure 14:
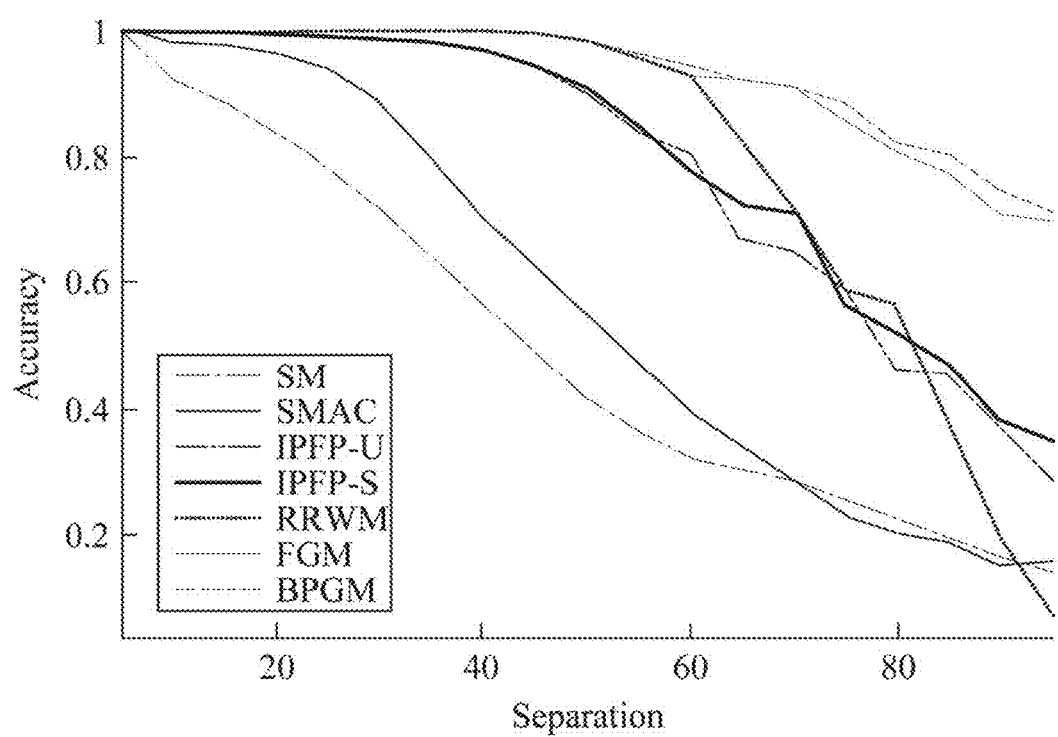
FIG. 14 is a graph illustrating an example of matching results based on a Carnegie Mellon University (CMU) house dataset and a CMU hotel dataset using various algorithms.

FIG. 14 is a graph illustrating an example of matching results based on a first example house dataset and a second example hotel dataset using various algorithms.

The first example house dataset and the second example hotel dataset are commonly used, and image sequences of the first example house dataset and the second example hotel dataset are most prevalent experimental data. Two consecutive images are, for example, images that each have widths of 111 and 110, and a graph of each of the widths has "30" feature nodes. Accuracies of the undirected graph matching method described above with reference to FIGS. 3 through 13 are shown in Table 1 below.

TABLE 1

| | Separation | | | | | | | | | |
|---|---|---|---|---|---|---|---|---|---|---|
| | 10 | 20 | 30 | 40 | 50 | 60 | 70 | 80 | 90 | 100 |
| Matching accuracy (%) | 100 | 100 | 100 | 100 | 100 | 100 | 99.9 | 100 | 99.7 | 100 |

FIG. 14 illustrates accuracies acquired by existing undirected graph matching algorithms, for example, a factorized graph matching (FGM), reweighted random walks for graph matching (RRWM), a spectrum matching (SM), an integer projected fixed point method initialized with a solution used for factorized graph matching for undirected graphs (IPFP-U), an integer projected fixed point method initialized with spectral matching (IPFP-S), a spectral matching with affine constraints (SMAC), and a binary constraint preserving graph matching (BPGM).

In FIG. 14, a horizontal axis represents a separation of an undirected graph model, and a vertical axis represents an accuracy of a result. In the undirected graph matching method described above with reference to FIGS. 3 through 13, nodes of all undirected graphs are accurately matched, whereas the existing undirected graph matching algorithms have matching accuracies less than 80%.

Figure 15:
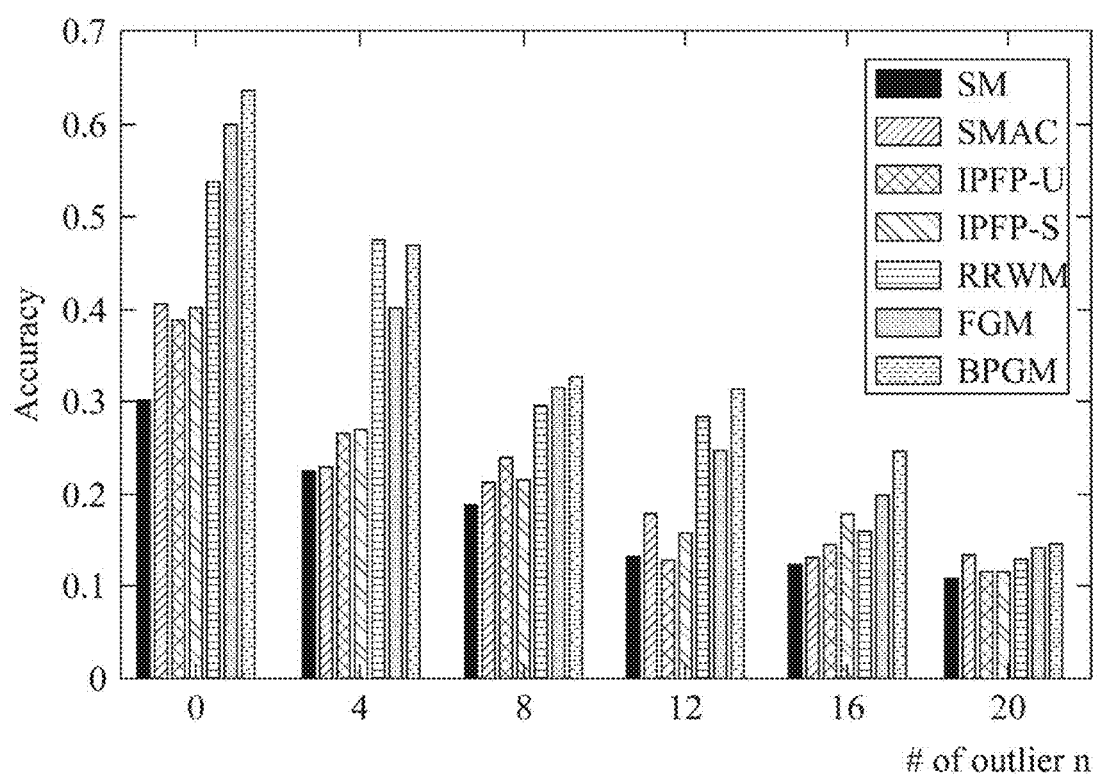
FIG. 15 is a graph illustrating an example of matching results based on a Pascal 2007 dataset using various algorithms.

FIG. 15 is a graph illustrating an example of matching results based on a Pascal 2007 dataset using various algorithms.

In the Pascal 2007 dataset, undirected graphs that need to be matched include a predetermined number of outliers. Matching accuracies obtained by the undirected graph matching method described above with reference to FIGS. 3 through 13 are shown in Table 2 below.

TABLE 2

| | Number of outliers | | | | | | | | | | |
|---|---|---|---|---|---|---|---|---|---|---|---|
| | 0 | 2 | 4 | 6 | 8 | 10 | 12 | 14 | 16 | 18 | 20 |
| Matching accuracy (%) | 92.5 | 84.1 | 72.5 | 51.3 | 46.6 | 54.3 | 34.6 | 34.8 | 27.2 | 23.4 | 31.0 |

FIG. 15 shows accuracies acquired by the existing undirected graph matching algorithms.

In FIG. 15, a horizontal axis represents a number of outliers and a vertical axis represents an accuracy of a result. In comparison to the existing undirected graph matching algorithms, the undirected graph matching method described above with reference to FIGS. 3 through 13 significantly enhances the matching accuracy.

The undirected graph processing apparatus 300, the communicator 310, the processor 320, and memory 330, other apparatuses, devices, and other components described herein with respect to FIGS. 1-15 are implemented as and by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 4 through 9 and 13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the processors or computers may execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method comprising:
    acquiring, by a processor, a first undirected graph from a first image and a second undirected graph from a second image, wherein the first image and the second image are images acquired by capturing a same scene from different viewpoints;
    generating, by the processor, a first lattice for the first undirected graph and a second lattice for the second undirected graph;
    matching, by the processor, the first lattice and the second lattice based on a first global structure of the first lattice and a second global structure of the second lattice, the first global structure corresponding to nodes of the first undirected graph, and the second global structure corresponding to nodes of the second undirected graph; and
    processing the first undirected graph and the second undirected graph based on a result of the matching of the first lattice and the second lattice.

2. The method of claim 1, wherein the first lattice and the second lattice represent features of edges and nodes of the first undirected graph and the second undirected graph, as coordinates, respectively.

3. The method of claim 1, wherein the generating of the first lattice and the generating of the second lattice comprises:
    generating the first lattice based on a non-metric multi-dimensional scaling (NMDS); and
    generating the second lattice based on the NMDS.

4. The method of claim 3, wherein the generating of the first lattice based on the NMDS comprises:
    randomly generating a target lattice; and
    generating the first lattice by optimizing the target lattice based on features of edges and nodes of the first undirected graph.

5. The method of claim 4, wherein the generating of the first lattice by optimizing the target lattice comprises:
    calculating a distance between a first point and a second point within the target lattice, the first point and the second point respectively corresponding to a first node and a second node of the first undirected graph,
    converting a feature of an edge between the first node and the second node to the distance between the first point and the second point based on a monotone function that does not include a parameter;
    calculating a Kruskal's stress-1 for the target lattice; and
    determining the target lattice to be the first lattice in response to a converging of the calculated Kruskal's stress-1.

6. The method of claim 5, wherein the monotone function is determined by minimizing the following expression:

$$\Sigma_{i,j}(r(w_{ij}^t) - d_{ij}^t)^2$$

in which r(•) denotes the monotone function, $w_{ij}^t$ denotes the feature of the edge between the first node and the second node, $d_{ij}^t$ denotes the distance between the first point and the second point, and i and j denote numerals within a total number of nodes of the first undirected graph.

7. The method of claim 6, wherein the Kruskal's stress-1 is calculated based on the following equation:

$$\text{Kruskal's stress-1} = \sqrt{\frac{\Sigma_{i,j}(r(w_{ij}^t) - d_{ij}^t)^2}{\Sigma_{i,j} d_{ij}^2}}.$$

8. The method of claim 1, wherein the matching of the first lattice and the second lattice comprises matching the first lattice and the second lattice based on a point set registration by preserving global and local structures (PR-GLS) algorithm.

9. The method of claim 1, wherein the acquiring of the first undirected graph and the second undirected graph comprises:
    generating the first undirected graph from a first image; and
    generating the second undirected graph from a second image.

10. The method of claim 9, wherein the processing of the first undirected graph and the second undirected graph comprises synthesizing the first image and the second image based on the matching of the first lattice and the second lattice.

11. The method of claim 9, wherein
    the first undirected graph and the second undirected graph are associated with a same object, and
    the processing of the first undirected graph and the second undirected graph comprises analyzing a posture of the object.

12. A non-transitory computer-readable storage medium storing instructions that, when executed by a processor, cause the processor to perform the method of claim 1.

13. An apparatus comprising:
    a memory configured to store a program to process a plurality of undirected graphs; and
    a processor configured to execute the program,
    wherein the program is executed by the processor to:
        acquire a first undirected graph from a first image and a second undirected graph from a second image, wherein the first image and the second image are images acquired by capturing a same scene from different viewpoints;
        generate a first lattice for the first undirected graph and generate a second lattice for the second undirected graph;
        match the first lattice and the second lattice based on a first global structure of the first lattice and a second global structure of the second lattice, the first global structure corresponding to nodes of the first undirected graph, and the second global structure corresponding to nodes of the second undirected graph; and
        process the first undirected graph and the second undirected graph based on a result of the matching of the first lattice and the second lattice.

14. The apparatus of claim 13, wherein, the first lattice and the second lattice represent features of edges and nodes of the first undirected graph and the second undirected graph, as coordinates, respectively.

15. The apparatus of claim 13, wherein the generating of the first lattice and the generating of the second lattice comprises:
    generating the first lattice based on a non-metric multi-dimensional scaling (NMDS); and
    generating the second lattice based on the NMDS.

16. The apparatus of claim 13, wherein the program is executed by the processor to match the first lattice and the second lattice based on a point set registration by preserving global and local structures (PR-GLS) algorithm.

17. The apparatus of claim 13, wherein the program is executed by the processor to:
  generate the first undirected graph from a first image; and
  generate the second undirected graph from a second image.

18. The apparatus of claim 17, wherein the program is executed by the processor to synthesize the first image and the second image based on the matching of the first lattice and the second lattice.

19. The apparatus of claim 17, wherein
  the first undirected graph and the second undirected graph are associated with a same object, and
  the program is executed by the processor to analyze a posture of the object.

\* \* \* \* \*